(12) United States Patent
Merrill et al.

(10) Patent No.: US 7,179,524 B2
(45) Date of Patent: Feb. 20, 2007

(54) INSULATED CERAMIC MATRIX COMPOSITE AND METHOD OF MANUFACTURING

(75) Inventors: Gary B. Merrill, Orlando, FL (US); Jay E. Lane, Murrysville, PA (US); Steven C. Butner, San Marcos, CA (US); Robert Kreutzer, Poway, CA (US); Jay A. Morrison, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 524 days.

(21) Appl. No.: 10/667,264

(22) Filed: Sep. 19, 2003

(65) Prior Publication Data

US 2004/0058201 A1    Mar. 25, 2004

Related U.S. Application Data

(60) Continuation-in-part of application No. 09/536,742, filed on Mar. 28, 2000, now Pat. No. 6,977,060, and a continuation-in-part of application No. 09/507,794, filed on Feb. 22, 2000, now Pat. No. 6,676,783, which is a division of application No. 09/428,197, filed on Oct. 27, 1999, now Pat. No. 6,287,511, which is a division of application No. 09/049,328, filed on Mar. 27, 1998, now Pat. No. 6,013,592.

(51) Int. Cl.
*B32B 3/00* (2006.01)

(52) U.S. Cl. .................................................. 428/313.7
(58) Field of Classification Search ................ 428/313, 428/402; 427/331, 376
See application file for complete search history.

(56) References Cited

U.S. PATENT DOCUMENTS 5,962,076 A * 10/1999 Mason et al. ............. 427/376.2
6,733,907 B2 * 5/2004 Morrison et al. ........... 428/699

* cited by examiner

*Primary Examiner*—Jennifer C. McNeil
*Assistant Examiner*—Daniel Miller

(57) ABSTRACT

A composite material (10) formed of a ceramic matrix composite (CMC) material (12) protected by a ceramic insulating material (14). The constituent parts of the insulating material are selected to avoid degradation of the CMC material when the two layers are co-processed. The CMC material is processed to a predetermined state of shrinkage before wet insulating material is applied against the CMC material. The two materials are then co-fired together, with the relative amount of shrinkage between the two materials during the firing step being affected by the amount of pre-shrinkage of the CMC material during the bisque firing step. The shrinkage of the two materials during the co-firing step may be matched to minimize shrinkage stresses, or a predetermined amount of prestress between the materials may be achieved. An aluminum hydroxyl chloride binder material (24) may be used in the insulating material in order to avoid degradation of the fabric (28) of the CMC material during the co-firing step.

11 Claims, 2 Drawing Sheets

US 7,179,524 B2

INSULATED CERAMIC MATRIX COMPOSITE AND METHOD OF MANUFACTURING

RELATED APPLICATIONS

The present application is a continuation-in-part of and claims benefit of the filing dates of application Ser. No. 09/536,742 filed Mar. 28, 2000, now U.S. Pat. No. 6,977,060 and of application Ser. No. 09/507,794 filed Feb. 22, 2000, now U.S. Pat. No. 6,676,783 which in turn is a divisional of application Ser. No. 09/428,197 filed Oct. 27, 1999 (now U.S. Pat. No. 6,287,511), which is a divisional of application Ser. No. 09/049,328 filed Mar. 27, 1998 (now U.S. Pat. No. 6,013,592). Each of these earlier patent applications is incorporated by reference herein.

FIELD OF THE INVENTION

This invention relates generally to the field of materials and more particularly to ceramic materials adapted for use in high temperature environments.

BACKGROUND OF THE INVENTION

Commercially available ceramic matrix composites (CMC's) have many potential applications in high temperature environments. CMC's are limited in their capability for exposure to temperatures near 1,200° C. In addition, CMC's cannot be cooled effectively under high heat flux conditions because of their relatively low thermal conductivity. Accordingly, it is desirable to provide a thermally insulating material for application to a ceramic matrix composite substrate material so that the insulated CMC composite can be used in a high temperature environment such as the hot gas flow path of a gas turbine engine.

BRIEF DESCRIPTION OF THE DRAWINGS

These and other advantages of the invention will be more apparent from the following description in view of the drawings that show.

DETAILED DESCRIPTION OF THE INVENTION

Figure 1:
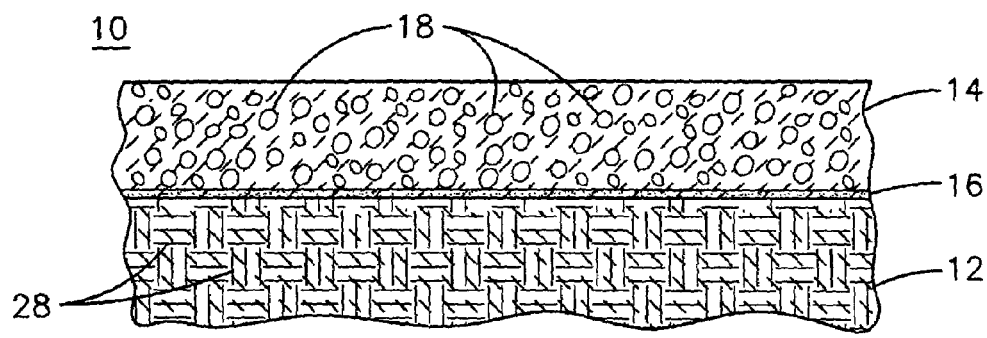
FIG. 1 is a partial cross-sectional view of a gas turbine component formed of a structural CMC substrate material covered by a layer of ceramic thermal insulation.

A gas turbine component is formed of a composite material 10 illustrated in partial cross-sectional view in FIG. 1. The composite material includes a structural ceramic matrix composite (CMC) substrate material 12 protected by a layer of ceramic insulating material 14. A layer of adhesive or other bond-enhancing material 16 may optionally be used between the CMC material 12 and the insulating material 14. The composite material 10 may be used to form a vane, combustor, blade ring or other such part of a gas turbine engine that is exposed to a high temperature environment where temperatures may exceed 1,600° C.

The CMC material 12 may be any known composite material having ceramic reinforcing structures disposed in a ceramic matrix material. Both oxide/oxide and non-oxide/non-oxide CMC materials are known. In one embodiment the CMC material 12 may be a commercially available oxide/oxide composite sold under the brand name AS/N720-1 by COI Ceramics, Inc. of San Diego, Calif. (www.coiceramics.com) AS/N720-1 material utilizes Nextel® N720 fibers (85% alumina and 15% silica in the form of mullite and alumina polycrystals) disposed in an aluminosilicate matrix, and it has an advertised continuous use temperature of 1,000° C. Accordingly, for use in an environment of temperatures greater than that value, a protective layer of thermally insulating material 14 is desirable.

U.S. Pat. No. 6,013,592 describes high temperature insulation for ceramic matrix composites. The insulating material utilizes a plurality of hollow oxide-based spheres of various dimensions, a phosphate binder and an oxide filler powder. The spheres are situated in the phosphate binder and filler powder such that each sphere is in contact with at least one other sphere in some form of close-packed arrangement, thereby providing dimensional stability to the insulation. The '592 patent also discloses the use of a coating of mullite or alumina between the insulating material and an underlying CMC material in order to prevent damage to the fibers of the CMC material.

It is possible to separately form a CMC layer and an insulation layer, then to join those two layers together with an adhesive. The present invention is an improvement in the manufacturing of such a CMC composite through co-processing of the two materials. However, if the prior materials of the '592 patent are co-processed, the aluminum orthophosphate binder used in the insulating material will degrade the Nextel® fibers in AS/N720-1 CMC material during the high temperature co-processing steps. The composite material 10 of the present invention innovatively utilizes an aluminumoxychloride binder in the insulating material 14 in order to prevent such degradation, thereby allowing the two layer 12, 14 to be sinter-bonded together in a co-processing step, with or without an intermediate bond-enhancing layer 16.

Figure 2:
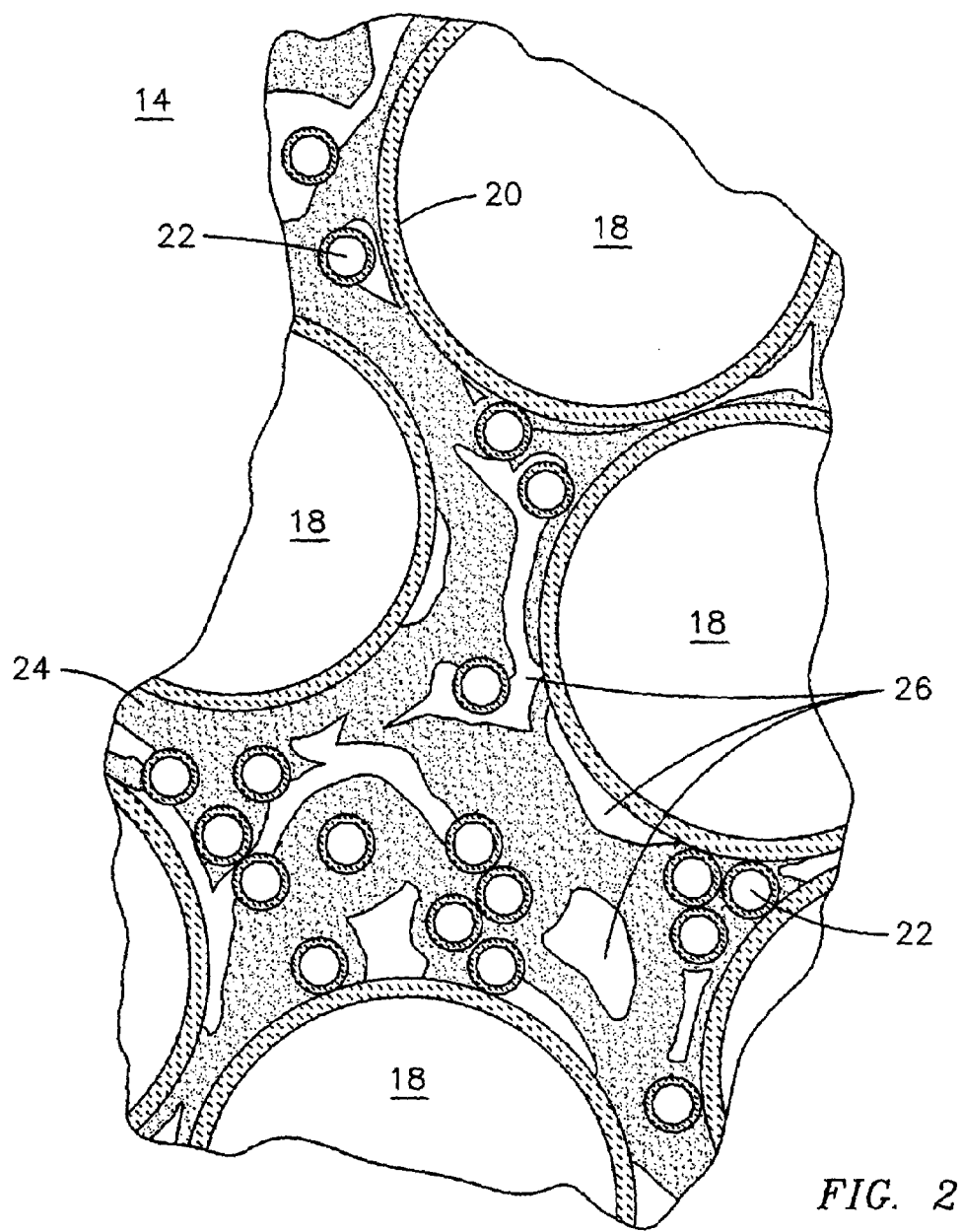
FIG. 2 is a partial cross-section view of the insulating material of FIG. 1.

FIG. 2 is a partial cross-sectional view of insulating layer 14. Hollow particles 18, such as the illustrated hollow spheres having walls 20, are shown substantially close packed with optional filler material 22, such as the illustrated smaller hollow spheres, with matrix binder material 24 disposed in the spaces between the hollow spheres 18 and the filler material 22. Optional voids 26 are also shown. In other embodiments, the hollow particles 18 may be substituted with solid particles or aggregate particles, or they may be formed of a structurally rigid material having a significant void fraction in order to provide the desired mechanical strength and thermal insulation properties. In one embodiment, the hollow particles 18 may be made of material that is 82% mullite and 18% alumina. The filler material may alternatively take the form of solid particles, fibers, whiskers, aggregations, etc. In one embodiment, the filler material is a 50%/50% mixture of alumina powders of two different size ranges, such as 20 micron particles and 0.3 micron particles. The illustrated hollow ceramic spheres 18 are manufactured such that the sphere walls 20 are near 70% to 100% of theoretical density, preferably near 90% to 100% of theoretical density (0% to 10% porous). For good erosion resistance, the wall thickness is preferably between about 100 micrometers to 400 micrometers, depending on sphere diameter. The hollow ceramic spheres control the dimensional stability of the insulating material 14 and inhibit gross volumetric shrinkage due to sintering of the matrix, regardless of the matrix binder material selected. The level of closed macroscopic porosity within the material 14 is affected by the overall size of the hollow ceramic spheres, the wall thickness of the spheres, and their packing arrangement within the structure. The binder 24 that interstitially bonds the hollow ceramic spheres together may also contribute a secondary role to these properties depending on the mechanical and thermal properties and the amount of binder materials used. The structure of the material 14 imparts unique combinations of properties including, for gas turbine applications, excellent erosion resistance, insulating properties, and abradability in an optimized combination not achieved by conventional means.

The material 14 shown in FIG. 2 is made with closed macroscopic porosity via the use of solid or hollow ceramic particles, such as hollow spheres 18 of size ranges between 200 micrometers diameter to 1800 micrometers diameter for example. The spheres may be independently formed and subsequently bonded together to form a macroscopic infrastructure. The bulk density of these spheres 18 themselves is anywhere between 0.1 and 0.9 of theoretical, that is 10% to 90%, taking into account the internal porosity, and depending upon the needs for each high temperature application. The close-packed, contiguous structure defines and controls the thermal and mechanical properties of the system 60 and maintains dimensional stability of the structure. Coordination numbers for the sphere packing can range from 1 to 14, but preferably, the coordination number of substantially all of the hollow shapes is from 5 to 12, and even more ideally from 5 to 8 for gas turbine coating applications. Some degree of randomness is preferred for maximum fracture toughness and strength. However, idealized packing arrangements and size distributions and high coordination numbers in the 8 to 14 range may be preferred for stiffness-driven applications such as cores for sandwich structures.

Spheres 18 may be separately formed and stabilized verses their being formed in-situ. The individually formed and bonded spheres impart unique properties to the material 14. Contact between dense-walled spheres is not overly intimate due to the binder and possibly smaller included spheres, thus allowing crack deflection and some degree of toughening of the material. Forming the spheres separately allows the stabilization of the spheres to a much higher temperature than otherwise possible.

For some applications, the absolute value of the wall thickness is important to achieving adequate erosion resistance. Therefore, the ratio of wall thickness to sphere radius (t/r) and overall diameter of the spheres must be considered. For example, if a 200 micrometer wall thickness is required for erosion resistance, and the overall bulk density of the material system is defined by abradability requirements, that is about 60%, this helps narrow down the range of sphere sizes possible. Other variables include sphere packing density and matrix density. Wall thickness will generally range from about 0.05 mm to 0.5 mm and may be about 0.15 mm.

The shape of the hollow particles may be spherical for ease of manufacture and for attaining isotropic properties. However, other similar shapes can be readily made and incorporated in like manner and perhaps introduce certain optimized properties, for example, the shapes can be hollow elongated spheroids or needlelike shapes either randomly oriented or preferentially oriented parallel or perpendicular to the substrate surface and having aspect ratios less than 5-to-1 and lengths between 200 micrometers and 1800 micrometers. Hollow ellipsoids or other irregular spheroids can be made and indeed are within the normal range of sphere manufacture. Mixtures of spheres, spheroids, low aspect ratio cylinders and other shapes are also natural extensions for use in the method of this invention and, in fact, at least one manufacturing process for hollow spheres also produces hollow, long needle structures. In certain embodiments the particles need not be hollow, but rather may be uniformly solid throughout.

Overall bulk density of the entire material system made using the method of this invention, including the sphere density, their packing arrangement, and the matrix/filler/binder material is generally in the range of 0.10 to 0.80 of theoretical density, depending on the application. For the example of turbine engine coatings for either insulation or abradability (or both), the range of overall density of the material system and its makeup can vary over a wide range. By controlling the bulk density, that is sphere size, sphere wall thickness and binder density of the material system, the properties can be optimized for erosion resistance and/or abradability. The best range for abradable coatings is 30% to 80% theoretical density. The best range for erosion resistance is from about a 0.3 to 0.5 t/r within the 30% to 80% range.

The insulation material 14 may utilize regular packing of uniformly sized spheres 18, however, the packing of the spheres 18 is not limited to a specific form, nor is it limited to uniformly sized spheres, nor is it limited to any kind of regularity of structure. Random packing is allowable, and non-uniform sphere sizing may be desirable to achieve higher sphere packing densities. In certain embodiments, the spheres may be loosely distributed within the matrix material, thereby being subject to much greater sintering shrinkage during processing. The present invention includes a method that can accommodate both close-packed embodiments having limited shrinkage and non-packed embodiments having much greater shrinkage.

Sphere walls must be over 70% dense, but are preferably near theoretical density (90% to 100% of theoretical density) to maintain thermal stability over the widest range of temperatures. The high density of the sphere walls imparts excellent erosion resistance and controls the thermal and mechanical behavior of the system. The manufacturing temperature of the hollow spheres is well in excess of the intended use temperature of the material system, for example, mullite ($3Al_2O_3 \cdot 2SiO_2$) hollow spheres can be manufactured at 1740° C., rendering them inert and stable in a material system operating indefinitely at 1600° C. to 1700° C. Separately forming and stabilizing the spheres to high temperatures ensures the thermal and dimensional stability of the system at future high temperature operating ranges up to 1700° C. and possibly beyond. The hollow ceramic spheres, rods, etc. are bonded together interstitially by a ceramic matrix material to form a contiguous and self-supporting structure. The volume content of the matrix material can vary from near zero to completely filling in the interstitial space between the hollow shapes. Preferably the matrix constitutes a minimum of 10% of the interstitial space between the hollow shapes for all coordination members. The matrix content and density are tailored to achieve the desired properties for the specific application, taking into account: the desired bond strength between hollow shapes; the overall bulk density required for abradability purposes; the individual and packing densities of the hollow shapes; permeability requirements; overall mechanical strength of the system; overall thermal conductivity properties desired; and mass considerations (for example, for flight applications).

The matrix may or may not contain filler material 22, including but not limited to smaller hollow spheres or other geometric shapes, powders, particles, platelets, and whiskers or chopped fibers or other discontinuous fibrous materials. In the case of thick-walled shapes where t/r is greater than 0.25, it may be advantageous to minimize the amount of matrix in the system—so long as the bond strength and other criteria are met. A very strong structure, particularly in compression, can be achieved with very little matrix addition.

The composition of the ceramic hollow shapes 18, 22 can be any oxide or non-oxide ceramic material including (but not limited to) those shown in Table 1 below:

TABLE 1

| OXIDES | CARBIDES | NITRIDES |
|---|---|---|
| Alumina, Silica | SiC, WC, NbC | $Si_3N_4$, TiN |
| Mullite, Zirconia | TaC, HfC, ZrC | SiCN |
| Zircon, YAG, Yttria | TiC | |
| Ceria, Hafnia, Beryllia | | |

Typically, high temperature, stable ceramic particulate filler materials are used to add density to the matrix (without necessarily adding strength), to add strength to the matrix, to add toughness to the matrix either via reinforcing or residual stress management, or to improve the volumetric yield of matrix infiltrates (cost savings). Typically, the filler material 22 in the slurry-based binder 24 may be of the composition but not limited to those in Table 2 below, and typical binders 24 are listed in Table 3 below.

| TABLE 2 | | TABLE 3 |
|---|---|---|
| FILLER | | BINDER |
| Mullite | with | Aluminosilicate and/or Aluminumphosphate |
| Alumina | with | Aluminumphosphate and/or Aluminumoxychloride |
| Zirconia | with | Aluminumorthophosphate |
| Hafnia | with | Aluminumorthophosphate |
| Yttria | with | Aluminumorthophosphate |
| Yttrium Aluminum Garnet (YAG) | with | Aluminumorthophosphate |
| Ceria | with | Aluminumorthophosphate |
| Silicon Carbide or Silicon Nitride | with | Polycarbosilane |
| Hollow Shapes of the Above | with | All Binders Listed Above |

These materials are slowly mixed together, usually with deionized water, to allow good dispersion. An acid, such as nitric acid, may be added to maintain the pH of the slurry infiltration solution in the range of approximately 3 to 4.

Figure 3:
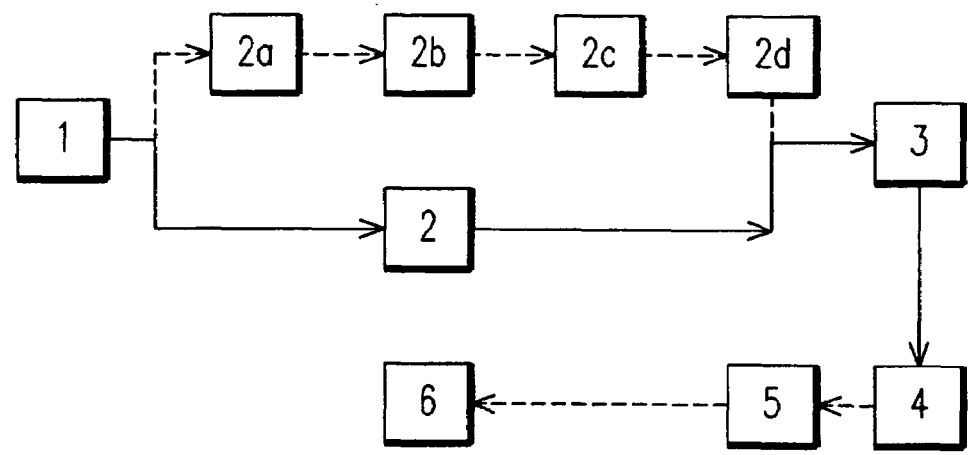
FIG. 3 is a block diagram illustrating steps in a method of manufacturing the insulating material of FIG. 2.

Referring now to FIG. 3, a diagram is shown of the method allowing fabrication of the composite material 10. In the method of this invention, a "chamber" which is meant to include press or mold having a top, bottom and sides, or a similar apparatus, is provided to initially contain either the geometric shapes first or the binder first. In one case, shown by the dotted lines, the geometric shapes are placed into a chamber—step (2a), the chamber is closed—step (2b), preferably air is evacuated—step (2c), thereafter the binder, filled or unfilled, is fed into the evacuated chamber to impregnate the geometric shapes—step (2d), which shapes are substantially close packed, usually as required for the material desired. Usually, a low vacuum is used initially, followed by a higher level of vacuum, to insure complete impregnation of the interstices between the hollow spheres. For example, the vacuum can start at 1 inch (2.54 cm) Hg and be raised, over a period of several hours, to as high as 35 inches (89 cm) Hg. Total vacuum impregnation may take ten to fifteen hours.

In another case, multiple steps are combined, where the binder is placed in the chamber, after which the shapes are inserted and left to settle, and optionally vibrated into a close packed array; or originally slowly stacked as such an array in the binder—all step (2) shown by a continuous line in FIG. 3. In the first instance (using steps 2a-2d), close packing of the shapes in the array is of prime importance since the shapes are stacked first, before binder is applied. In the second instance (step 2 with continuous lines), complete filling of void spaces within the array is of prime importance since binder may be fed into the chamber first. In both cases there will be good permeation and penetration of the binder into the void spaces. The binder permeated packed array, no mater how accomplished, is then dried—step (3) followed by heating—step (4) and possibly sintering at a stepped temperature rate—step (5) and, optionally, binding to a substrate—step (6). The entire chamber can be heated up to about 80° C., with the impregnated micro spheres in place, as an initial heating step to remove excess water during step (3).

To insure that the impregnated micro sphere body will not crumble, the chamber with the body intact can be heated to about 400° C. before removing the body from the mold. After the body is removed, it can be further heated, in steps of 2° C. to 10° C. per minute, to 1000° C., to form a secure, unitary structure. To form a true refractory version, the body can be further heated, in steps of 3° C. to 10° C. per minute, to about 1600° C. and held for approximately four to five hours. If desired, the unitary body can also be vacuum infiltrated with a ceramic binder, such as aluminum hydroxyl chloride, with a stepped vacuum up to about 35 inches (89 cm) Hg, followed by heating and firing at temperatures ranging from 1200° C. to 1600° C.

Figure 4:
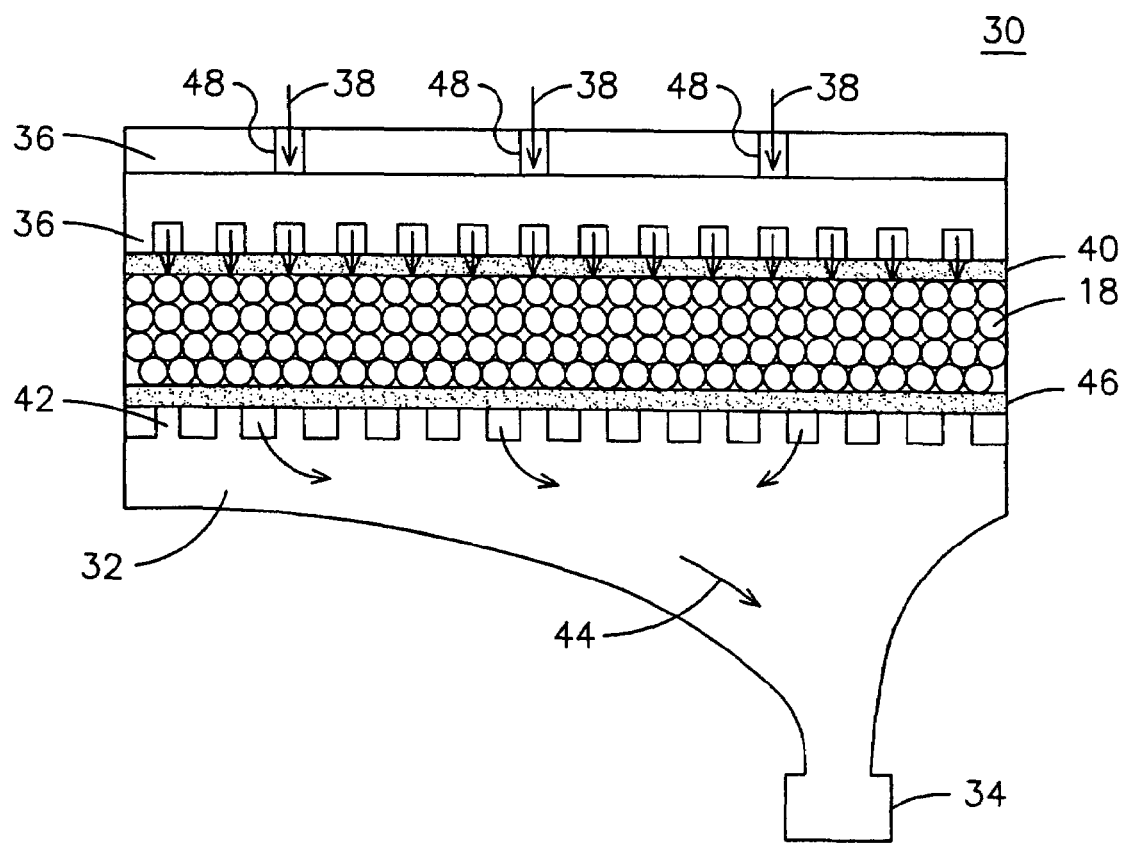
FIG. 4 is a schematic diagram of a vacuum/packing mold that may be used in the method illustrated in FIG. 3.

The process of manufacturing via this invention may include vacuum impregnation using an inner and an outer mold as shown in FIG. 4. The inner shell 32 of the chamber 30 is connected to a vacuum system 34 capable of producing pressures to at least 30 mbar. The outer mold 36 consists of a rigid mold shell through which the binder slurry 38 can enter and pass and slowly infiltrate through the already packed spheres 18. Of course, for example, other low profile cylinder shapes or the like could also be used. As is generally shown, the slurry 38 passes through an opening in the top of mold 36, to additional openings in the bottom part of mold 36, and then between spheres 18. At the top surface of the spheres, a porous layer 40 such as plastic meshing is applied to allow mold separation after pressing and filling. The inner mold 32 also consists of a rigid former 42 through which extracted liquid can be removed, as shown by arrow 44, as a result of vacuum impregnation of the particles. In addition to the plastic meshing on this side of the mold, an additional filter layer 46 is required that can effectively prevent any fine particles 22 (from FIG. 2) in the slurry 38 from passing through the inner mold. This is typically a filter that does not allow particles 22 to pass through, but does allow the liquid medium to pass through and to go into the vacuum system so that it can be collected. The porous layer 40 that provides for easy separation may be plastic based, is typically less than 0.5 mm thick and can be removed easily after infiltration or during partial firing of the entire assembly. The filter 46 is typically made of paper and is less than 0.25 mm thick and will burn away during the firing process leaving no residue.

In operation, impregnation of the spheres 18 is achieved preferably using a water-based slurry 38 that can enter through single or plural openings 48. The slurry may consist of a mixture of small particulates and binders, the function of which is to pack as effectively as possible in the spaces between the larger sphere's or particles' outer walls. The goal of the impregnation is to fill the interstices of the hollow sphere packed structure with small filler particles after drying. The water (or other specified liquid) is a carrier medium that transports the powder particles from outside the structure into the interior of the hollow sphere compact. The vacuum 34 then removes the carrier, leaving the solid particles and binder to fill the outer sphere spaces. The amount of slurry required can be calculated as a function of the available intersphere volume. Excess is always preferred to ensure complete filling. The casting operation may be performed using overpressure rather than a vacuum in certain embodiments.

Particle size of any impregnated filler particle can be varied to affect the appropriate packing density required around the larger particles 18. A typical example of this combination could be coarse mullite ($3Al_2O_3 \cdot 2SiO_2$) and fine alumina ($Al_2O_3$). The particle size ratio between large to small particles should be in the range of 8:1 to 25:1, preferably 10:1 to 15:1. When very small particles are used (5 micrometers or less), nitric acid may be added to the slurry to enhance separation of the particles in order to provide more effective infiltration.

As mentioned previously, after impregnation and drying, the body (in green form) may be detooled or partially detooled and dry fired at intermediate temperatures of from about 400° C. to 600° C. to impart some green strength. Subsequently, the green casting may be further infiltrated with a liquid-based binder. This may be completed either under atmospheric pressure or vacuum, depending on the viscosity of the binder. A number of liquid binder solutions can be used to form effective binding of the system. These include monoaluminum phosphate, aluminum hydroxyl chloride and ceramic sols that generate alumina, silica, aluminosilicate, yttria or zirconia solids. All of these binders dictate different and specific firing schedules. Alternately, a higher temperature firing of the green form can be used to sinter the structure together. This latter will give the most refractory form of the material, but the product will be more brittle. This factor may be important if finish machining is required to bring the coating segments to near net shape and therefore to minimize any machining requirements.

Potential applications of this method are to manufacture an insulating coating that can be used on semi-structural ceramic matrix composite components for gas turbines such as transitions, combustor liners, etc., and for insulating coatings for use on structural ceramic matrix composite components such as vanes. Other applications for the material system of this invention may include making materials for application as combustor liners (can, annular, and can-annular configurations), transition ducts, static airfoils and platforms (vanes), seals (both blade tip and interstage), and virtually any static surface exposed to a hot gas path. Aerospace applications include aircraft hot gas (engine exhaust) impinged structures and surfaces; thermal protection systems (TPS) for aerospace vehicles (hypersonic or re-entry protection); stiff, lightweight panels or structures for space systems (satellites, vehicles, stations, etc.), etc. Diesel or other ICE applications include cylinder liners, exhaust ports, header liners, etc.

Co-processing of the CMC material 12 and the insulating material 14 of FIG. 1 may facilitate the manufacturing of complex shapes and it may reduce manufacturing cycle time. The CMC material 12 may be based upon an aluminosilicate matrix material or an alumina matrix material, for example. The sinter bond provided by co-processing may also eliminate the need for a secondary bond-enhancing material 16. Co-processing may be accomplished by wet-processing of the insulating material 14 against the CMC material 12 to form a strong bond there between during a thermal curing step. To accomplish such co-processing the binder 24 of the insulating material 14 must be compatible with and must not degrade the CMC material 12. Furthermore, the shrinkage of the CMC 12 and insulation 14 must be considered during the drying and firing steps. The relative shrinkage of these two layers will affect the level of stress imparted there between. The manufacturing procedure disclosed herein allows the insulating material 14 to be co-processed with a partially manufactured CMC material 12 in order to control the relative shrinkage there between.

In order to accept the wet insulation material 14 onto a surface of the CMC material 12, the CMC material 12 is first processed to a partially cured state. This state involves compaction of the layers of fabric 28 to achieve the required fiber volume fraction as required for the desired strength properties of the final product. The compaction process for the CMC may be achieved through either a process of hard face compression tooling or vacuum bagging. The "green" CMC is then dried and bisque fired at an intermediate temperature to develop limited strength in the CMC material to facilitate handling of the structure. The CMC material may be processed to any desired degree depending upon the amount of shrinkage desired during the subsequent firing process. A typical range of bisque firing temperatures for A/N720-1 material (Nextel® fibers in an alumina matrix) would be between 400–1,100° C. At 400° C. the shrinkage of the bisque CMC body would be practically zero. At 1,100° C. the shrinkage of the CMC body would be about 0.1%. Typically, most of the shrinkage of the CMC material occurs during the final firing of the CMC, which can be as high as or higher than 0.45% for example. Shrinkage of the insulating material 14 will depend upon the method used to pack the spheres 18. Insulating material 14 containing close-packed particles 18 may exhibit shrinkage of 0.1% to the fully fired condition. Insulating material 14 that is formed from pre-mixed slurry without close packing of the spheres 18 may exhibit shrinkage of 0.5% to the fully fired condition. By pre-shrinking the CMC material 12 to a predetermined degree considering the expected shrinkage of the insulating material 14 prior to applying wet insulating material 14, the relative shrinkage of the two layers during subsequent co-processing steps may be controlled. In one embodiment, the CMC material 12 may be bisque-fired to a temperature above 400° C. prior to applying the wet insulating material 14, and in another embodiment, the CMC material 12 may be bisque-fired to a temperature above 1,100° C. prior to applying the wet insulating material 14. The green body ceramic matrix composite material may be processed prior to the application of the insulating material to an extent necessary to essentially match shrinkage of the partially cured ceramic matrix composite material 12 to the shrinkage of the ceramic insulating material 14 during a subsequent co-curing step. Alternatively, the green body CMC material 12 may be processed to a state wherein shrinkage of the partially cured CMC material 12 is no more than the shrinkage of the ceramic insulating material 14 during the subsequent co-curing step. Alternatively, the CMC material 12 may be selectively bisque fired to a predetermined state that achieves a selected degree of shrinkage mismatch between the CMC material 12 and the ceramic insulating material 14 during the co-curing step.

Once the bisque CMC material 12 has been prepared, the wet insulating material 14 is applied to the surface of the bisque CMC 12. A pre-mixture of wet ceramic insulating material 14 may be applied to the surface of the bisque CMC, essentially using the CMC material 12 as one face of a mold. Alternatively, the hollow spheres 18 or other selected type of hollow or solid particles can be applied in a close packed array around the CMC 12 and then a slurry of matrix material 24 with or without filler material 22 may be administered under pressure or vacuum to the compacted sphere array. In either case, a tooling enclosure is required that will hold the wet insulating material 14 while it dries to form a green bond with the CMC material 12. The pre-mixture of wet ceramic insulating material 14 will likely shrink more than the infused close-packed array, since matrix material will reside between adjacent spheres 18 in the pre-mixture and will thus be prone to increased sintering during a subsequent firing cycle. In order to promote increased bonding strength between the CMC material 12 and the wet insulating material 14, a thin layer pre-coat of a ceramic adhesive or other bond-enhancing material 16 may be applied to the CMC material 12 prior to application of the wet insulating material 14.

After the wet insulating material 14 has been applied to the surface of the bisque fired CMC material 12, the material is then dried in air to remove excess liquid and is then fully fired to form the insulated CMC composite material 10. During the firing cycle the desired degree of relative sintering shrinkage of the two materials 12, 14 is achieved, thus forming a strong sinter bond between the two materials 12, 14. If the relative shrinkage is controlled to be perfectly matched or closely matched, i.e. within ±0.05% or alternatively within ±0.1% of each other, or alternatively within ±0.25% of each other a reduced level of residual stress between the two layers can be realized. Alternatively, this process can be used to manufacture a selected amount of mismatch in relative shrinkages, thereby allowing for selected pre-stressing of the composite 10 if desired. For example, if close-packed insulating material 14 is used, the CMC material 12 may be pre-cured to achieve shrinkage of about 0.30% prior to the application of the insulating material 14. Subsequent co-processing steps will result in final curing shrinkage of about 0.15% for the CMC material 12, which is within 0.05% of the final curing shrinkage of 0.1% of the close-packed insulating material 14. In another example where a slurry of the insulating material 14 is used, the CMC material 12 may be processed to only a green state with no pre-firing, since the shrinkage of the respective materials during the subsequent co-firing may be 0.45% and 0.50%, or within a desired 0.05%.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A material adapted for use in a high temperature environment comprising:
    an oxide-oxide ceramic matrix composite material;
    a layer of ceramic insulating material bonded to a surface of the ceramic matrix composite material, the insulating material further comprising:
    a plurality of hollow particles, each particle in contact with at least one other of the particles; and
    an aluminum hydroxyl chloride binder at least partially filling gaps between the particles.

2. The material of claim 1, further comprising an oxide filler material dispersed among the particles, the binder at least partially filling gaps between the particles and the filler material.

3. The composite material of claim 1, wherein the particles comprise a close packed array of hollow oxide-based spheres with each sphere in contact with a plurality of other of the spheres.

4. The composite material of claim 1, wherein the particles each comprise a hollow sphere formed of a wall material comprising 82% mullite spheres and 18% alumina.

5. The composite material of claim 1, further comprising a layer of adhesive disposed between the ceramic matrix composite material and the ceramic insulating material.

6. The composite material of claim 1, wherein the ceramic matrix composite material comprises fibers comprising alumina and silica disposed in an alumino-silicate matrix.

7. The composite material of claim 1, wherein the ceramic matrix composite material comprises fibers comprising alumina and silica disposed in an alumina matrix.

8. A material adapted for use in a high temperature environment comprising:
    a plurality of hollow oxide-based particles of various dimensions;
    an aluminum hydroxyl chloride binder at least partially filling gaps between the particles;
    whereby the particles are situated in the binder such that each particle is in contact with at least one other particle.

9. The material of claim 8, further comprising an oxide filler material dispersed among the particles, the binder at least partially filling gaps between the particles and the filler material.

10. The material of claim 8, wherein the particles comprise a close-packed array of hollow oxide-based spheres.

11. The material of claim 8, wherein the particles each comprise a hollow sphere formed of a wall material comprising 82% mullite spheres and 18% alumina.

* * * * *